US012502908B2

(12) United States Patent
Pagliaro

(10) Patent No.: US 12,502,908 B2
(45) Date of Patent: Dec. 23, 2025

(54) COSMETIC PENCIL SHARPENER

(71) Applicant: Katri Pagliaro, Haddon (AU)

(72) Inventor: Katri Pagliaro, Haddon (AU)

( * ) Notice: Subject to any disclaimer, the term of this patent is extended or adjusted under 35 U.S.C. 154(b) by 288 days.

(21) Appl. No.: 18/471,420

(22) Filed: Sep. 21, 2023

(65) Prior Publication Data

US 2024/0092117 A1 Mar. 21, 2024

(30) Foreign Application Priority Data

Sep. 21, 2022 (AU) ................................ 2022902735

(51) Int. Cl.
*B43L 23/06* (2006.01)

(52) U.S. Cl.
CPC .................................. *B43L 23/06* (2013.01)

(58) Field of Classification Search
CPC ...................................................... B43L 23/06
USPC ........................................................... 30/457
See application file for complete search history.

(56) References Cited

U.S. PATENT DOCUMENTS 194,525 A * 8/1877 McLane .................. B43L 23/00 30/451
716,732 A * 12/1902 Mead ...................... B43L 23/08 30/461
969,323 A * 9/1910 Andreson ............... B43L 23/08 30/461
1,479,921 A * 1/1924 Miller ..................... B43L 23/08 30/457
1,531,738 A * 3/1925 Davis ...................... B43L 23/00 30/454
2,642,044 A * 6/1953 Mussguller ............. B43L 23/08 30/457
3,851,687 A * 12/1974 Jones ...................... B43L 23/06 30/90.1
4,485,862 A * 12/1984 Mattheis ................ B43L 23/08 30/454
5,303,721 A * 4/1994 Bowen .................... A24F 13/20 131/248
5,745,996 A * 5/1998 Kenny .................... E04G 21/12 83/947
6,279,238 B1 * 8/2001 Gillson ................... B43L 23/06 30/461
7,036,231 B2 * 5/2006 Luttgens ................ B43L 23/08 30/457
7,363,714 B2 * 4/2008 Luttgens ................ B43L 23/08 30/457
11,273,666 B1 * 3/2022 Moufawad .............. B43L 23/08
2009/0129849 A1 * 5/2009 Schmidt ............... B43K 24/026 401/50
2015/0041350 A1 * 2/2015 Moeck ................ B43K 23/001 206/371

(Continued)

*Primary Examiner* — Omar Flores Sanchez
(74) *Attorney, Agent, or Firm* — INNOVATION CAPITAL LAW GROUP, LLP; Vic Lin

(57) ABSTRACT

An enclosure forms the structure of a cosmetic pencil sharpener, featuring an entry point for pencil insertion and a sharpening mechanism that interacts with this entry. This sharpening mechanism consists of a pair of opposing planar cutting blades, each possessing straight cutting edges directed away from the entry. When put into action, these cutting blades separate upon pencil insertion, and they are designed to come together with a bias. This results in the cutting edges engaging the pencil's tip from opposite directions as the pencil is withdrawn.

21 Claims, 3 Drawing Sheets

(56) References Cited

U.S. PATENT DOCUMENTS

2018/0117953 A1* 5/2018 Tani ...................... B43L 23/085
2019/0283487 A1* 9/2019 Gupta ..................... B43L 23/06

* cited by examiner

COSMETIC PENCIL SHARPENER

FIELD OF THE INVENTION

This invention relates generally to a sharpener for cosmetic pencils.

BACKGROUND OF THE INVENTION

In the realm of cosmetics, there exists a distinctive type of product known as cosmetic pencils. Unlike conventional pencils made from wood, these cosmetic pencils possess a unique composition: they feature a wrapped paper shaft, setting them apart from their traditional counterparts. This choice of materials is deliberate and serves to cater to the specific needs of the cosmetic industry.

One notable application of these cosmetic pencils lies within the cosmetic tattoo industry where precision and accuracy are paramount, especially when it comes to activities such as marking brow tattoo stencils. Achieving the desired result hinges upon the ability to create well-defined and precise markings. This is where the concept of shaping the pencil tips comes into play.

To attain the necessary level of precision, cosmetic pencils are often cut to a specific type of point known as a "flat point" or a "duckbill" point. These terms describe a specialised tip shape that enhances the accuracy of the markings. The flat point, as its name suggests, involves cutting the pencil's tip to create a level surface. The duckbill point, on the other hand, refers to a tip that tapers outward, resembling the shape of a duck's bill.

Crafting these intricate tip shapes usually involves a meticulous process involving a handheld knife and a skilled hand.

While using a handheld knife to sharpen cosmetic pencils offers precision, it also presents some disadvantages. The process can be time-consuming and requires a steady hand, making it less efficient for large-scale production. Additionally, there's a risk of over-sharpening, leading to breakage or waste of the cosmetic product. Furthermore, manual sharpening might not consistently produce the exact same tip shape every time, which could impact the intended application accuracy.

SUMMARY OF THE DISCLOSURE

Presented herein is a cosmetic pencil sharpener, encompassing a casing with an entry point for pencils and a sharpening mechanism that interfaces effectively with this entry. The sharpening mechanism incorporates a pair of opposing flat cutting blades, featuring straight edges oriented away from the entry point.

During usage, these cutting blades move apart when a pencil is inserted between them. They are biased to draw together, causing their cutting edges to intersect and cut the pencil's tip as it's withdrawn. This process yields the desired flat point for the pencil. To maintain precise alignment, the sharpener may integrate a centring mechanism. Moreover, the entry point can include a collar that guides the pencil's insertion orientation relative to the blade's edges. Varying diameter entry points may be positioned between the blades to accommodate differently sized pencils.

For enhanced usability, a portion of the casing might be transparent, enabling users to visually assess the pencil tip's rotation concerning the cutting blades. Achieving blade cohesion, compression springs can be employed. These not only ensure proper blade alignment but also assist in the sharpener's assembly and disassembly.

The blades pivot on axles through blade mounts, possibly crafted from aluminium or plastic. Meanwhile, the blades themselves could be fashioned from more robust steel. These mounts are designed to counteract the pulling force applied when the pencil is retracted.

Should replacement be necessary, the blades can be swapped by either interconnecting new ones with the blade mounts or by disassembling the casing into separate components to facilitate blade mount replacement.

The cosmetic pencil sharpener offers several advantages over using a handheld knife for sharpening. Firstly, it provides consistent results by creating uniform tip shapes, which is often challenging with manual methods. The sharpener's mechanism ensures precision without the risk of over-sharpening, minimizing wastage of the cosmetic product.

Secondly, the sharpener is more time-efficient, especially in high-volume scenarios, as it automates the sharpening process. This is in contrast to the manual method which requires individual attention and can be time-consuming.

Additionally, the sharpener's design includes features like a centring mechanism and collar, guaranteeing accurate alignment and guiding pencil insertion for optimal sharpening. Such precision is harder to achieve consistently with a handheld knife.

Furthermore, the transparent casing allows users to monitor the sharpening progress visually, enhancing control and accuracy. This visual feedback is absent when using a handheld knife.

Lastly, the use of compression springs for blade cohesion ensures consistent results.

As such, the cosmetic pencil sharpener excels in delivering reliable, efficient, and precise results, making it a superior choice compared to the manual method of using a handheld knife for sharpening cosmetic pencils.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
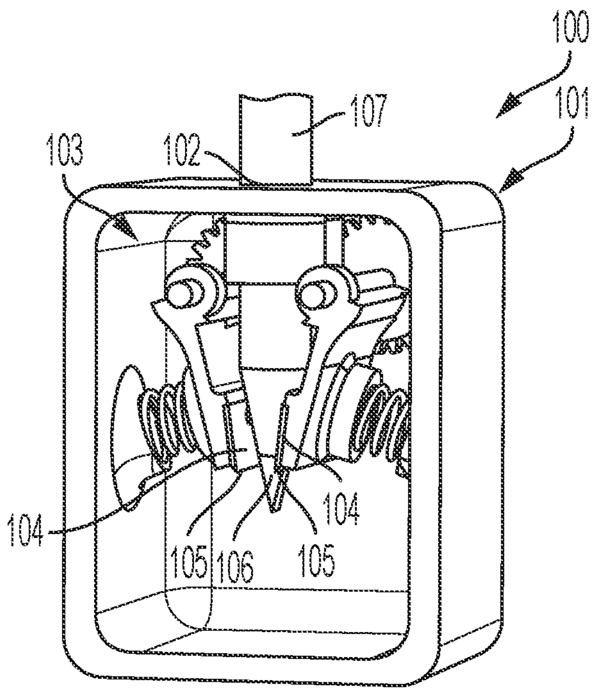
FIG. 1 shows a perspective view of a cosmetic pencil sharpener in accordance with an embodiment.

A cosmetic pencil sharpener 100 comprises an enclosure 101 comprising a pencil insertion entrance 102 and a sharpening mechanism 103 operably interfacing the entrance 102.

The sharpening mechanism 103 comprises an opposing pair of planar blades 104 having straight cutting edges 105 orientated away from the entrance 102.

In use, the manner shown in FIG. 1, the blades 104 move apart when a pencil 107 is inserted therebetween through the entrance 102. The blades 104 are biased together so that the cutting edges 105 cut oppositely into a tip 106 of the pencil 107 as the pencil 107 is retracted, thereby forming the tip 106 into a flat point as is illustrated in FIG. 1.

At least a portion of the enclosure 101 may be transparent so as to aid judging of the rotational orientation of the pencil 107 when engaged between the blades 104.

Figure 4:
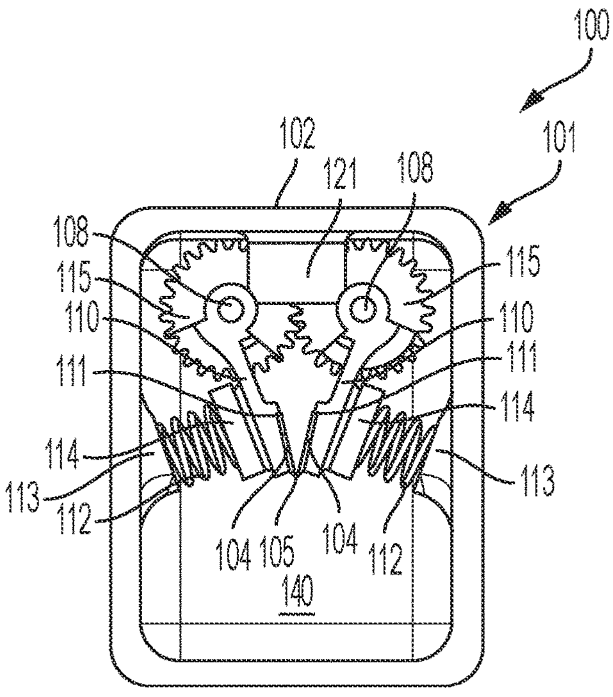
FIG. 4 shows a cross-sectional elevation view of the sharpener with the cutting blades thereof together.
Figure 5:
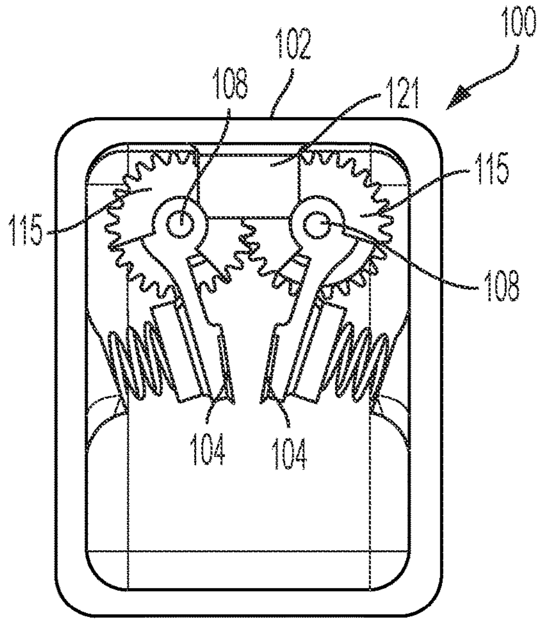
FIG. 5 shows a cross-sectional elevation view of the sharpener with the cutting blades thereof apart.

As shown in FIG. 4, the cutting edges 105 preferably meet so as to be able to form the tip 106 into a sharp edge. As is further shown in FIG. 4, the blades 104 may comprise inner planar surfaces and outside edge chamfers.

The blades 104 may be mounted with respect to a respective pivot points 108. The pivot points 108 may be located more towards the entrance 102 with respect to the blades 104 and located either side of the entrance 102. As is shown in FIG. 4, the blades 104 therefore meet at an angle which allows the blades 104 to be pushed apart and also to cut the tip 106 at a corresponding angle.

Figure 7:
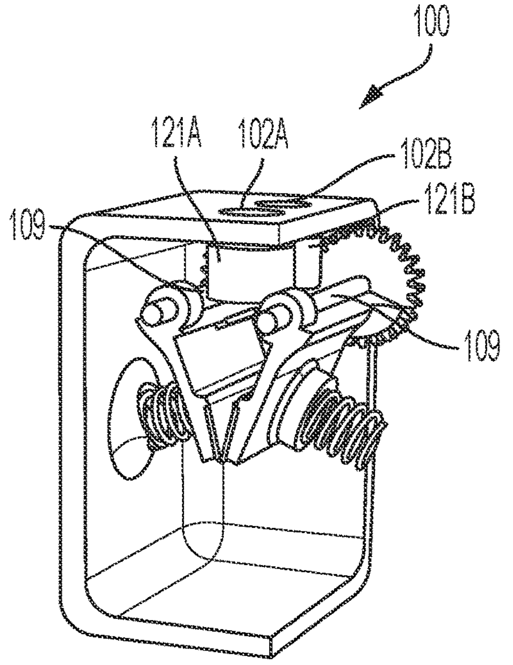
FIG. 7 shows a further perspective interior view of the sharpener.

As is shown in FIG. 7, the pivot points 108 may be defined by axles 109 journaled between opposing surfaces of the enclosure 101. In embodiments, the offset between the pivot points 106 may be adjusted by controlling the offset between the axles 109 (such as by inserting the axles 109 in one of a chosen series of axle mounts) to control the cutting angle of the blades 104.

The blades 104 may be coupled to distal ends of blade mounts 110. The blade mounts 110 may be aluminium or plastic whereas the blades 104 may be made of more durable steel. The blades 104 may be removably coupled to the mounts 110 by a removable fastening.

As is shown in FIG. 4, distal ends of the mounts 110 may define a recessed seat for the blades 104 constrained by upper edges 111 to withstand pulling force as the pencil 107 is retracted.

The blades 104 may be biased together with a biasing mechanism. The biasing mechanism may comprise a spring mechanism.

As shown in FIG. 4, the spring biasing mechanism may comprise a pair of compression springs 112 acting between the blades 104 and interior surfaces of the enclosure 101.

Figure 8:
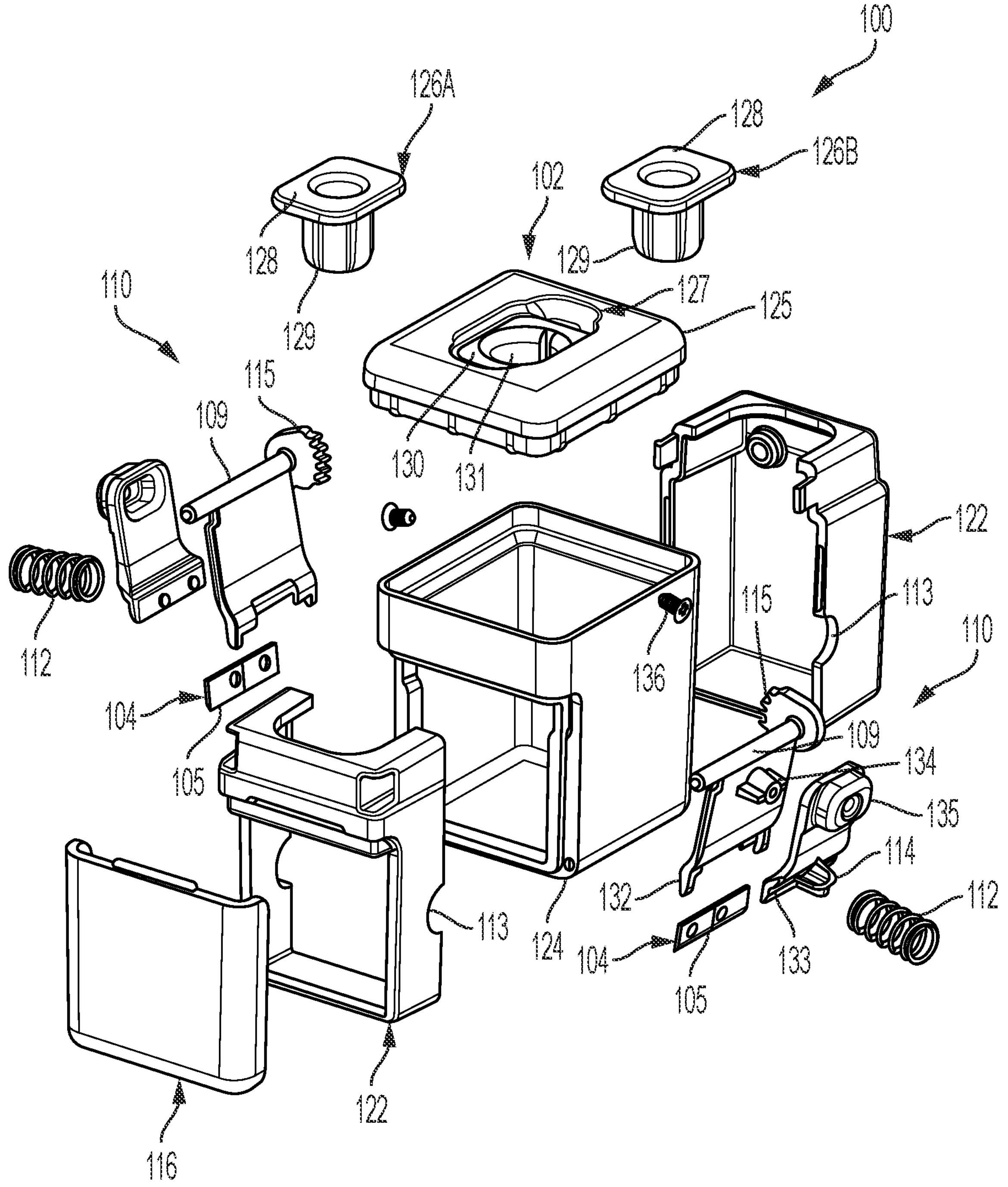
FIG. 8 shows an exploded perspective view of the sharpener in accordance with a further embodiment.

Interior surfaces of the enclosure 101 may comprise spring engagements 113. The spring engagements 113 may comprise annular buttresses which are orientated along longitudinal axes of the compression springs 112. The spring engagements shown in FIG. 8 are apertures.

The blade mounts 110 may similarly comprise spring engagements 114 on outer surfaces thereof. The spring engagements 113, 114 hold the compression spring 112 therebetween when the spring 112 is compressed but allow the installation or removal thereof by compressing the spring 112 away from one of the engagements 113 or 114.

Figure 6:
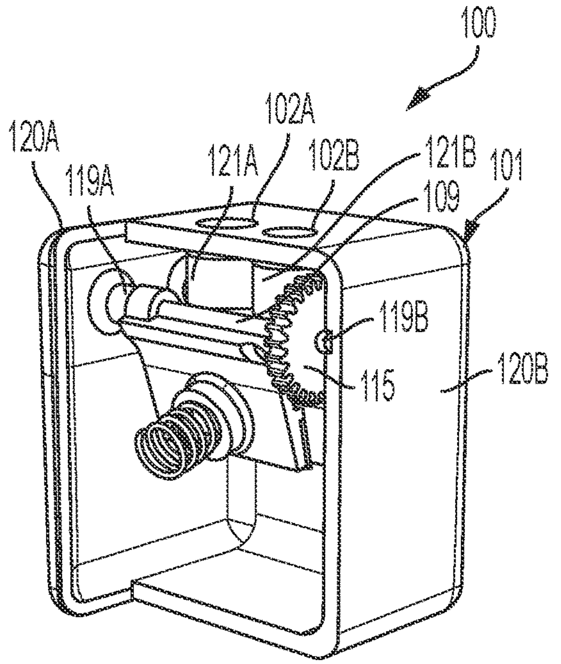
FIG. 6 shows a perspective interior view of the sharpener.

As shown in FIGS. 6 and 7, the springs 112 may insert within the spring engagements 114. However, in the embodiment shown in FIG. 8, the spring engagement 114 comprises a buttress which is surrounded by a corresponding end of the spring 112. The spring engagement 114 may comprise a narrowing end for facilitating insertion of the spring 112 thereover. Furthermore, the spring engagements 113 may locate quite close to distal ends of the blade mounts 110 to thereby maximise the pressure applied by the springs 112.

Furthermore, in embodiments, the outer surfaces of the blade mounts 110 may comprise screw holding buttresses (not shown) for accommodating screws therethrough which hold the blades in place.

The sharpener 100 may further comprise a centring mechanism which centres the cutting edges 105 of the blades a midpoint with respect to the entrance 102.

The centring mechanism may comprise counterrotating meshed cogwheels 115 interfacing the axles 109 defining the pivot points 108. The counterrotating meshed cogwheels 115 ensure that the blade mounts 110 move synchronously in an opposite manner.

The enclosure 101 may define a shaving storage area 140 beneath the sharpening mechanism 103.

Figure 3:
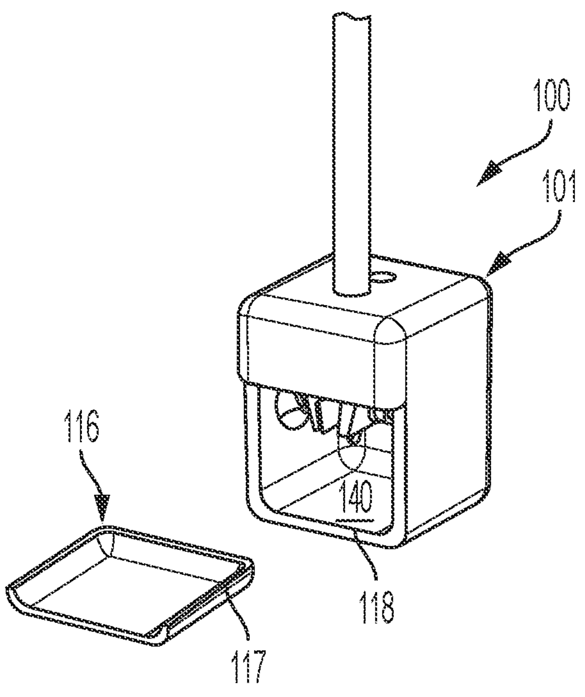
FIG. 3 shows a perspective view of the sharpener showing a removable cover for emptying a shaven storage area.

As is shown in FIG. 3, a cover 116 of the enclosure 101 may be removable to empty the storage area 140. The cover 116 may comprise a profiled edge 117 which clips into a corresponding profiled edge 118 of the enclosure 101.

As is shown in FIG. 6, the axles 109 may be journaled between mounts 119. Furthermore, the enclosure 101 may comprise separate pieces 120 with respective mounts 119 thereon. As such, the axles 109 may be released by separating the pieces 120 whereafter the blade mounts 110 may be replaced to replace the blades 104. One of the mounts 119A may comprise an annular hub whereas the other 119B may comprise a recessed blind hole.

The entrance 102 may interface a collar 121 to restrain the insertion orientation of the pencil 107. The collar 121 comprises an interior diameter closely matching that of the outer diameter of the pencil 107 intended for sharpening to limit orientation of the pencil 107 to ensure that the tip 106 thereof is substantially aligned between the cutting edges 105 of the blades 104.

Figure 2:
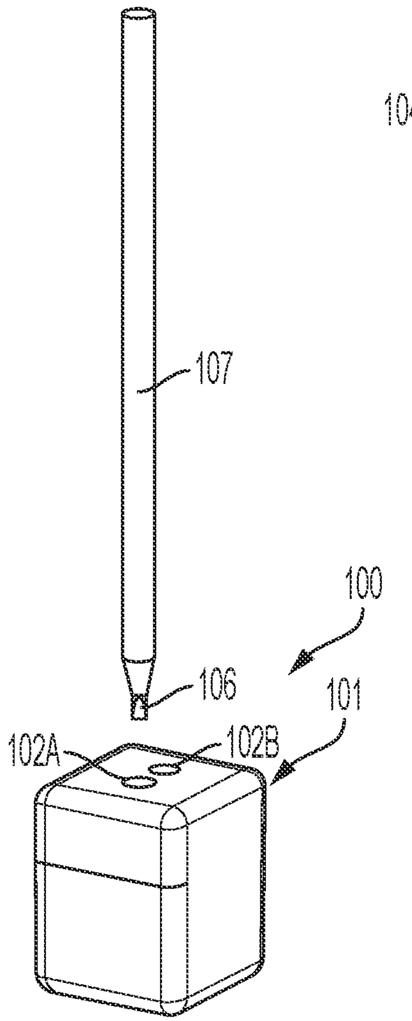
FIG. 2 shows a perspective view of the sharpener illustrating the insertion of a pencil therein.

As is shown in FIG. 2, the enclosure 101 may define a plurality of entrances 102 in alignment between the blades 104. The entrances 102 may have differing diameters for different sized pencils. Furthermore, each entrance 102 may comprise a respective collar 121 as shown in FIG. 6.

As shown in FIG. 6, a portion of the axle 109 extending beyond the cogwheel 115 may be relatively short so that the axle 109 and cogwheel 115 may be disengaged within the room allowed by the most adjacent collar 121.

According to the embodiment shown in FIG. 8, the housing 101 comprises interior housing portions 122 which fit together within outer housing portion 124. These portions 123, 124 may be enclosed by a removable lid portion 125 defining the entrance 102 therein.

As opposed to the lid 125 defining a plurality of entrances 102 as is shown in FIGS. 2 and 3, according to the embodiment of FIG. 8, the sharpener 100 comprises interchangeable sleeves 126 which fits within a corresponding socket 127 defined by the lid portion 125. Each sleeve may comprise a flange 128 and a barrel 129. Sleeves 126 with barrels 129 of differing internal diameters may be provided to accept pencils of differing sizes. For example, sleeve 126A may have a greater interior diameter barrel 129 as compared to that of the other sleeve 126B.

The socket 127 may define a recess area 130 which fits the flanges 128 and an aperture 131 therethrough which fits the outer diameters of the barrels 129. In this regard, the barrels 129 may have a variable interior diameter but a constant exterior diameter.

As also shown in FIG. 8, the blade mounts 110 may comprise an inner blade mount portion 132 and an outer blade mount portion 133 which connect together to sandwich the blade 104 therebetween. The outer blade mount portion 133 may define the aforedescribed spring engagement 114. The inner blade mount portion 132 may comprise an interior connector 134 which screws into a socket 135 of the outer blade mount portion 133 using a screw fastener 136.

The outer housing portion 124 and one of the interior housing portions 122 may comprise collocating apertures for the transparent screen 116.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A cosmetic pencil sharpener comprising:

an enclosure comprising a pencil insertion entrance and a sharpening mechanism operably interfacing the entrance, the sharpening mechanism comprising an opposing pair of planar cutting blades having straight cutting edges orientated away from the entrance and wherein, in use, the cutting blades move apart when the pencil is inserted therebetween and are biased together so that the cutting edges cut oppositely into a tip of the pencil as the pencil is retracted; and a centring mechanism which centres the cutting edges of the cutting blades at a midpoint with respect to the entrance.

2. The sharpener as claimed in claim 1, wherein the cutting edges meet one another.

3. The sharpener as claimed in claim 2, wherein the blades comprise inner planar surfaces and outside edge chamfers.

4. The sharpener as claimed in claim 1, wherein the blades are mounted with respect to pivot points, wherein the pivot points are located towards the entrance with respect to the blades are located either side of the entrance.

5. The sharpener as claimed in claim 4, wherein the blades meet at an angle.

6. The sharpener as claimed in claim 1, wherein the blades are coupled to distal ends of blade mounts, the blade mounts interfacing the pivot points at proximal ends thereof.

7. The sharpener as claimed in claim 6, wherein the blades are removably coupled to the mounts and wherein distal ends of the mounts define a recess seat for the blades constrained by edges towards the entrance.

8. The sharpener as claimed in claim 1, wherein the blades are biased together with a biasing mechanism.

9. The sharpener as claimed in claim 8, wherein the blades are biased together with a spring mechanism.

10. The sharpener as claimed in claim 9, wherein the blades are biased together by compression springs acting between the blades and interior surfaces of the enclosure.

11. The sharpener as claimed in claim 10, wherein spring engagements interface the blades and the compression spring.

12. The sharpener as claimed in claim 11, wherein the blades are coupled to distal ends of blade mounts and wherein the blade mounts comprise the spring engagements on outer surfaces thereof.

13. The sharpener as claimed in claim 1, wherein the blades interface pivot points and wherein counterrotating meshed cogwheels interface the pivot points.

14. The sharpener as claimed in claim 1, wherein the blades interface axles defining the pivot points.

15. The sharpener as claimed in claim 13, wherein the axles are journaled between mounts and wherein the enclosure comprises separate pieces comprising respective mounts.

16. The sharpener as claimed in claim 1, further comprising a plurality of pencil insertion entrances arranged in alignment between the blades.

17. The sharpener as claimed in claim 1, further comprising a plurality of sleeves having differing internal diameters interchangeably engaged by an aperture of the lid to accept pencils of differing diameters in use.

18. The sharpener as claimed in claim 1, wherein at least a portion of the enclosure is transparent.

19. A method of sharpening a cosmetic pencil using the sharpener as claimed in claim 1, the method comprising inserting a pencil into the entrance of the sharpener between the cutting blades and then pulling the pencil from the entrance so that the cutting blades cut oppositely into the tip of the pencil to form a wedge shape.

20. A cosmetic pencil sharpener comprising:

an enclosure comprising a pencil insertion entrance and a sharpening mechanism operably interfacing the entrance, the sharpening mechanism comprising an opposing pair of planar cutting blades having straight cutting edges orientated away from the entrance and wherein, in use, the cutting blades move apart when the pencil is inserted therebetween and are biased together so that the cutting edges cut oppositely into a tip of the pencil as the pencil is retracted;

compression springs acting between the cutting blades and interior surfaces of the enclosure, wherein the compressions springs are configured to bias the blades together;

spring engagements, wherein the spring engagement interface the blades and the compression springs; and blade mounts, wherein the cutting blades are coupled to distal ends of the blade mounts and wherein the blade mounts comprise the spring engagements on outer surfaces thereof.

21. A cosmetic pencil sharpener comprising an enclosure comprising a pencil insertion entrance and a sharpening mechanism operably interfacing the entrance, the sharpening mechanism comprising an opposing pair of planar cutting blades having straight cutting edges orientated away from the entrance and wherein, in use, the cutting blades move apart when the pencil is inserted therebetween and are biased together so that the cutting edges cut oppositely into a tip of the pencil as the pencil is retracted, wherein the blades interface axles defining pivot points and the axles are journaled between mounts and wherein the enclosure comprises separate pieces comprising respective mounts.

* * * * *